United States Patent [19]

Kanno: Yuji et al.

[11] Patent Number: 5,099,425
[45] Date of Patent: Mar. 24, 1992

[54] METHOD AND APPARATUS FOR ANALYZING THE SEMANTICS AND SYNTAX OF A SENTENCE OR A PHRASE

[75] Inventors: Kanno: Yuji; Kenji Nagao, both of Kawasaki; Kenichi Udea, Tokyo, all of Japan

[73] Assignee: Matsushita Electric Industrial Co., Ltd., Japan

[21] Appl. No.: 405,163

[22] Filed: Sep. 11, 1989

[30] Foreign Application Priority Data

Dec. 13, 1988 [JP] Japan .............................. 63-314047

[51] Int. Cl.$^5$ .............................................. G06F 15/38
[52] U.S. Cl. .................................................... 364/419
[58] Field of Search ................. 364/419, 200, 900, 419

[56] References Cited

U.S. PATENT DOCUMENTS

| | | | |
|---|---|---|---|
| 4,833,610 | 5/1989 | Zamora et al. | 364/419 |
| 4,833,611 | 5/1989 | Fukumochi et al. | 364/419 |
| 4,849,898 | 7/1989 | Adi | 364/419 |
| 4,931,935 | 6/1990 | Ohira et al. | 364/419 |
| 4,931,936 | 6/1990 | Kugimiya et al. | 364/419 |

FOREIGN PATENT DOCUMENTS 0008981 1/1985 Japan ..................................... 364/419

OTHER PUBLICATIONS

"An Efficient Context-Free Parsing Algorithm" Jay Earley, Communications of the ACM, Jan., 1983.

Primary Examiner—Dale M. Shaw
Assistant Examiner—Xuoung M. Chung
Attorney, Agent, or Firm—Lowe, Price, Leblanc & Becker

[57] ABSTRACT

Meanings of words, phrases, and a sentence are expressed in items. Items, which have equal contents, of a plurality of semantic structures are represented by a common item during the expressing of the meanings. Items, which have different contents, of the semantic structures are written in parallel during the expressing of the meanings. The semantic structures are rewritten into a parallel semantic structure through the representing and the writing. Contents of the parallel semantic structure are examined and corrected in consideration of a parallel characteristic of the parallel semantic structure.

5 Claims, 12 Drawing Sheets

FIG. 8(A)

{((0), 1, [V  [spelling [time]]
            [OR  [nil  [i/t    [i]]
                       [case-pattern [A]]]
                 [nil  [i/t    [t]]
                       [case-pattern [B]]]]]), ((0), 1, [N  [spelling [time]]
            [sem-label [ABS] [QUA]]
            [agr  [sng]]]), ((1), 2, [V  [spelling [fly]]
            [agr    [3] [sng]]
            [OR  [nil  [i/t    [i]]
                       [case-pattern [C]]]
                 [nil  [i/t    [t]]
                       [case-pattern [D] [E]]]]]), ((1), 2, [N  [spelling [fly]]
            [agr   [pl]]
            [sem-label [OR [nil [ABS]]
                           [nil [ANI]]]]]), ((2), 3, [V  [spelling [like]]
            [i/t    [t]]
            [case-patterm [F]]]), ((2), 3, [P  [spelling [like]]
            [type   [2]]]), ((2),3, [C    [spelling [like]]]), ((2),3, [N    [spelling [like]]
              [sem-label [ABS]]
              [agr [sng]]]), ((3),4, [A    [spelling [a]]
              [agr [sng][vow]]]), ((4),5, [N    [spelling [arrow]]
              [sem-label [CON]]
              [agr [sng][vow]]]), ((5),6, [Per [spelling [·]]])}

FIG. 10

$\{\ (S \rightarrow \bar{S} \cdot EM, \quad f_1(r_1, r_2))$, $(\bar{S} \rightarrow NP \cdot VP, \quad f_2(r_1, r_2))$, $(\bar{S} \rightarrow VP, \quad f_3(r))$, $(NP \rightarrow NP \cdot PP, \quad f_4(r_1, r_2))$, $(NP \rightarrow N \cdot NP, \quad f_5(r_1, r_2))$, $(NP \rightarrow A \cdot NP, \quad f_6(r_1, r_2))$, $(\bar{S} \rightarrow \bar{S} \cdot PP, \quad f_7(r_1, r_2))$, $(VP \rightarrow V \cdot NP, \quad f_8(r_1, r_2))$, $(PP \rightarrow P \cdot NP, \quad f_9(r_1, r_2))$, $(NP \rightarrow N, \quad f_{10}(r))$, $(VP \rightarrow V, \quad f_{11}(r))$,

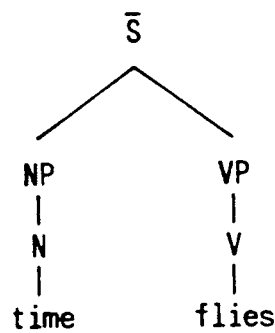

FIG. 11(b)

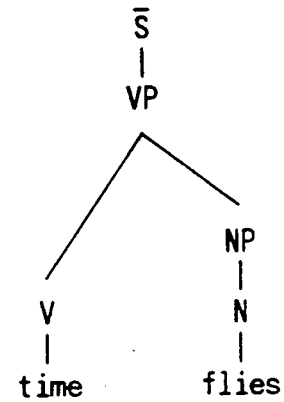

FIG. 12(a)

$$(0), 2. \left[ \bar{s} \begin{array}{l} [\text{ pred } [\text{ fly }]] \\ [\text{ tense } [\text{ present }]] \\ [\text{ voice } [\text{ active }]] \\ [\text{ quantitative } [\begin{array}{l}[\text{ pred } [\text{ time }]] \\ [\text{ sem-label } [\text{ ABS }] [\text{ QUA }]]\end{array}]] \end{array} \right]$$

FIG. 12(b)

$$(0), 2. \left[ \bar{s} \begin{array}{l} [\text{ pred } [\text{ time }]] \\ [\text{ tense } [\text{ present }]] \\ [\text{ voice } [\text{ active }]] \\ [\text{ mood } [\text{ imperative }]] \\ [\text{ object } [\begin{array}{l}[\text{ pred } [\text{ fly }]] \\ [\text{ numb } [\text{ pl }]] \\ [\text{ sem-label } [\text{ ANI }]]\end{array}]] \end{array} \right]$$

FIG. 13

$$S \begin{bmatrix} [\text{tense } [\text{present }]] \\ [\text{voise } [\text{active }]] \\ \text{OR} \begin{bmatrix} \text{nil} \begin{bmatrix} [\text{pred } [\text{fly }]] \\ [\text{quantitative } \begin{bmatrix} [\text{pred } [\text{time }]] \\ [\text{sem-label } [\text{ABS }] [\text{QUA }]] \end{bmatrix}] \end{bmatrix} \\ \text{nil} \begin{bmatrix} [\text{pred } [\text{time }]] \\ [\text{mood } [\text{imperative }]] \\ [\text{object } \begin{bmatrix} [\text{pred } [\text{fly }]] \\ [\text{numb } [\text{pl }]] \\ [\text{sem-label } [\text{ANI }]] \end{bmatrix}] \end{bmatrix} \end{bmatrix} \end{bmatrix}$$

```
f₂ = (lambda  (r1 r2)
        (change-value-pair r1 r2 `( CASE ) `( CASE MARK PAT ).
            (lambda  (v1 v2)
                (let  ((% case-frame nil))
                    (setg % case-frame
                            (add-value-pair v2
                                                ( case-pickup v1 )))
                (if  (case-filling-check % case-frame)
                    (values ( case-marker v1 ) % case-frame)
                    (values nil nil))))))
```

FIG. 15

$$\begin{bmatrix} S & [\text{tense} \ [\text{present}]] \\ & [\text{voise} \ [\text{active}]] \\ & \begin{bmatrix} OR & \begin{bmatrix} \text{nil} & \begin{bmatrix} \text{restriction} \ [\text{pred} \ [\text{like}]] \\ \begin{bmatrix} \text{instance} \ [\text{pred} \ [\text{arrow}]] \\ [\text{numb} \ [\text{sng}]] \end{bmatrix} \end{bmatrix} \\ \begin{bmatrix} OR & \begin{bmatrix} \text{nil} \ [\text{pred} \ [\text{fly}]] \\ [\text{quantitative} \ [\text{pred} \ [\text{time}]]] \end{bmatrix} \\ \begin{bmatrix} \text{nil} \ [\text{pred} \ [\text{time}]] \\ [\text{mood} \ [\text{imperative}]] \\ \begin{bmatrix} \text{object} \ [\text{pred} \ [\text{fly}]] \\ [\text{numb} \ [\text{pl}]] \end{bmatrix} \end{bmatrix} \end{bmatrix} \end{bmatrix} \\ \begin{bmatrix} \text{nil} \ [\text{pred} \ [\text{like}]] \\ \begin{bmatrix} \text{agent} \ [\text{pred} \ [\text{fly}]] \\ [\text{numb} \ [\text{pl}]] \\ [\text{modifier} \ [\text{pred} \ [\text{time}]]] \end{bmatrix} \\ \begin{bmatrix} \text{object} \ [\text{pred} \ [\text{arrow}]] \\ [\text{numb} \ [\text{sng}]] \end{bmatrix} \end{bmatrix} \end{bmatrix} \end{bmatrix} \end{bmatrix}$$

METHOD AND APPARATUS FOR ANALYZING THE SEMANTICS AND SYNTAX OF A SENTENCE OR A PHRASE

BACKGROUND OF THE INVENTION

This invention relates to a method and an apparatus for analyzing the semantics or the meaning of a word, a phrase, or a sentence in a language such as the Japanese language or the English language. This invention also relates to a method and apparatus for analyzing the syntactic structure or construction of a sentence in a language. The methods and apparatuses of this invention are usable in various systems such as document proofreading systems or machine translation systems.

A main part of a computer-based Japanese-text proofreading system or a computer-based Japanese-English translation system analyzes the syntax or the grammatical structure of a Japanese sentence and reexpresses the meaning of the sentence in a handy structure, and then operates on the structure to obtain an intended operation or output. There is a demand for an efficient method of analyzing the meaning of a Japanese sentence or an efficient method of analyzing the syntax of a Japanese sentence.

SUMMARY OF THE INVENTION

It is an object of this invention to provide an efficient method and an efficient apparatus for analyzing the semantics or the meaning of a sentence or phrase in a language.

It is another object of this invention to provide an efficient method and an efficient apparatus for analyzing the syntax or the grammatical structure of a sentence in a language.

According to a first aspect of this invention, a method of analyzing semantics comprises the steps of expressing meaning of words, phrases, and a sentence in items; representing items, which have equal contents, of a plurality of semantic structures by a common item during said expressing step; writing items, which have different contents, of the semantic structures in parallel during said expressing step; rewriting the semantic structures into parallel semantic structure through said representing step and said writing step; and examining and correcting contents of the parallel semantic structure in consideration of a parallel characteristic of the parallel semantic structure.

According to a second aspect of this invention, a method of analyzing a syntax comprises the steps of expressing meanings of words, phrases, and a sentence in items; representing items, which have equal contents, of a plurality of semantic structures by a common item during said expressing step; writing items, which have different contents, of the semantic structures in parallel during said expressing step; rewriting the semantic structures into a parallel semantic structure through said representing step and said writing step; examining and correcting contents of the parallel semantic structure in consideration of a parallel characteristic of the parallel semantic structure; applying a grammar rule to at least one of the words, the phrases, and the sentence; and collecting semantic structures of at least two of the words, the phrases, and the sentence, which can be handled together according to the grammar rule, into a single composite semantic structure by use of said parallel semantic structure.

According to a third aspect of this invention, a method of analyzing a syntax comprises the steps of analyzing morphemes of an input sentence and converting the input sentence into a set of combinations of morphemes, said morphemes including start position information, end position information, morphological information, syntactic information, and semantic information; representing items, which have equal contents, of a plurality of semantic information in said set by a common item; writing items, which have different contents, of the semantic information in said set in parallel; rewriting the semantic information into a parallel semantic structure through said representing step and said writing step; and examining and correcting contents of the parallel semantic structure in consideration of a parallel characteristic of the parallel semantic structure.

According to a fourth aspect of this invention, a method of analyzing a syntax comprises the steps of adding positional information and semantic structures to respective separate morphemes of an input sentence to generate modified morphemes; converting the input sentence into a set of the modified morphemes; representing items, which have equal contents, of the modified morphemes by a common item; and applying a grammar rule to said set to analyze the set.

According to a fifth aspect of this invention, an apparatus for analyzing semantics comprises means for expressing meanings of words, phrases, and a sentence in items; means for representing items, which have equal contents, of a plurality of semantic structures by a common item during said expressing of the meanings; means for writing items, which have different contents, of the semantic structures in parallel during said expressing of the meanings; means for rewriting the semantic structures into a parallel semantic structure by use of said representing means and said writing means; and means for examining and correcting contents of the parallel semantic structure in consideration of a parallel characteristic of the parallel semantic structure.

According to a sixth aspect of this invention, an apparatus for analyzing a syntax comprises means for expressing meanings of words, phrases, and a sentence in items; means for representing items, which have equal contents, of a plurality of semantic structures by a common item during said expressing of the meanings; means for writing items, which have different contents, of the semantic structures in parallel during said expressing of the meanings; means for rewriting the semantic stuctures into a parallel semantic structure by use of said representing means and said writing means; means for examining and correcting contents of the parallel semantic structure in consideration of a parallel characteristic of the parallel semantic structure; means for applying a grammar rule to at least one of the words, the phrases, and the sentence; and means for collecting semantic structures of at least two of the words, the phrases, and the sentence, which can be handled together according to the grammar rule, into a single composite semantic structure by use of said parallel semantic structure.

BRIEF DESCRIPTION OF THE DRAWINGS

FIGS. 8A and 8B are an illustration of an example of a set of morphemes in the system of FIG. 7.

FIG. 9 is a diagram of a part of the system of FIG. 7.

FIG. 10 is an illustration of an example of augmented context-free grammar rules used in the system of FIG. 7.

FIGS. 11(a) and 11(b) are tree diagrams showing results of a part of the analysis in the system of FIG. 7.

FIGS. 12(a) and 12(b) are illustrations of an example of elements in the work area of the system of FIG. 7.

FIG. 13 is an illustration of the results of the collection of the elements in FIG. 12.

FIG. 14 is an illustration of an instruction for operating a parallel semantic structure in the system of FIG. 7.

FIG. 15 is an illustration of the results of the analysis in the system of FIG. 7.

Like and corresponding elements are denoted by the same reference characters throughout the drawings.

DESCRIPTION OF THE FIRST PREFERRED EMBODIMENT

Figure 1:
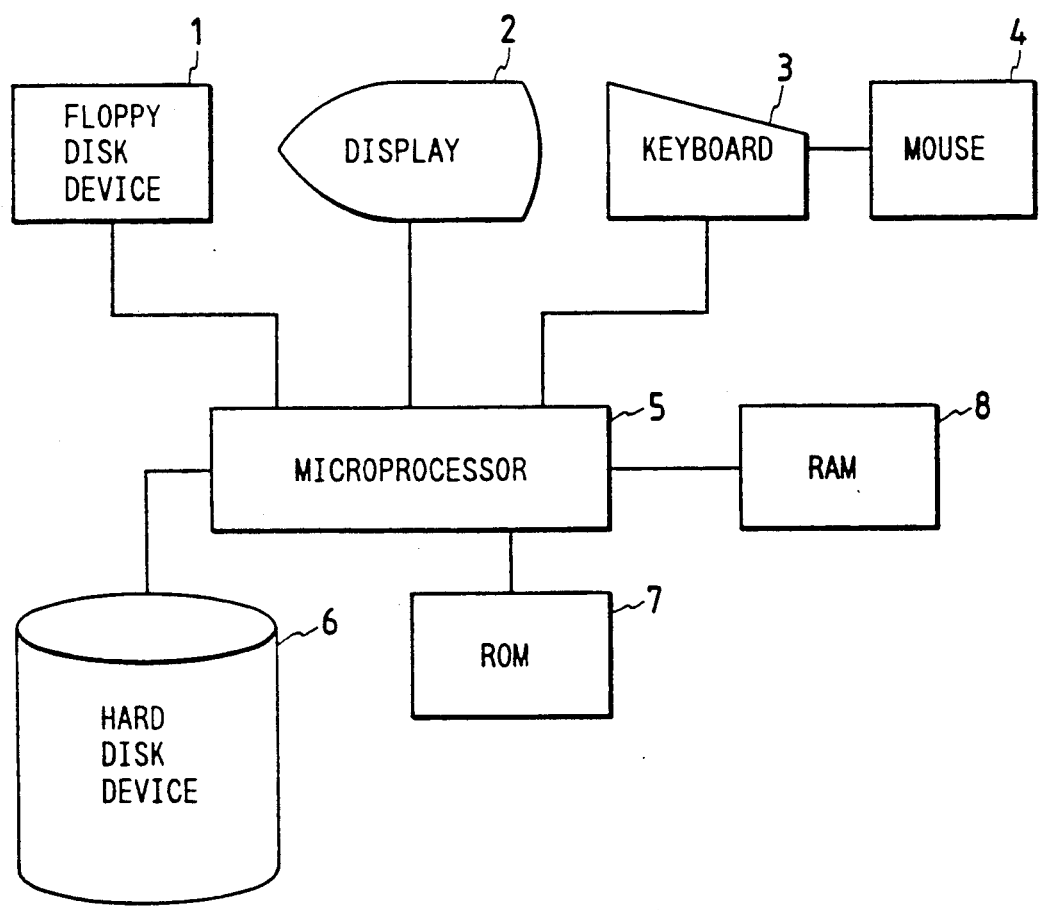
FIG. 1 is a block diagram of a Japanese-text proofreading and polishing system according to a first embodiment of this invention.

The Japanese language in a written form will be explained briefly hereinafter. In a Japanese sentence of a written form, characters are arranged sequentially but there is no separating space between the words. This written Japanese form is quite different from the written English or German form. Therefore, in order to analyze the semantics or the meaning of a Japanese sentence, it is neccessary to recoginze words and then rewrite the sentence in a word-separate form where the recognzed words are expressed in a separate manner. The process of recognizing words has a step of separating characters into groups corresponding to respective words. Japanese characters include "hiraganas", "katakanas", "romajis", and "kanjis" whose singular forms are written as "a hiragana", "a katakana", "a romaji", and "a kanji" respctively. "Hiraganas", "katakanas", and "romajis" are phonetic symbols. "Romajis" enable a method of writing Japanese in Roman characters. "Kanjis" are ideographic characters. General Japanese sentences include a mixture of "hiraganas" and "kanjis". Some Japanese sentences include "katakanas" and "romajis" in addition to "hiraganas" and "kanjis". In the Japanese language, there are no standard rules that determine what type of a word should be written in "hiraganas" or "kanjis". Accordingly, a word is written in "hiraganas" in some cases and is written in "a kanji or kanjis" in other cases. There are many homonyms in Japanese words. In general, homonyms can be represented by different "kanjis" respectively. The previously-mentioned features of the Japanese language make it relatively difficult to analyze the syntax or the construction of a Japanese sentence in comparison with the analysis of the construction of an English seentence. Especially, since there are many different possible separations of characters into groups corresponding to words and since there are several different interpretations of each of some words, a Japanese sentence can be rewritten into many different word-separate forms during the process of analyzing morphemes of the Japanese sentence. This causes a large quantity of necessary calculation during a subsequent analyzing process and also greatly affects the accuracy of the analysis.

A prior art Japanese word processor will be explained briefly hereinafter for a better understanding of this invention and the Japanese language. The Japanese language has more than 6000 different "kanjis" but has only about 50 different "hiraganas". Since a keyboard of the prior art Japanese word processor has a limited number of buttons, "kanjis" can not be directly inputted into the word processor via the keyboard. Therefore, during the inputting of a general Japanese sentence including a mixture of "hiraganas" and "kanjis" into the word processor, full-"hiragana" sentence corresponding to the general Japanese sentence is inputted into the word processor via the keyboard, and parts of the full-"hiragana" sentence are converted into corresponding "kanjis" through a "hiragana"-"kanji" converting process executed by a computer within the word processor. When there are many homonyms corresponding to different "kanjis" respectively, some "hiraganas" tend to be converted into wrong "kanjis". It is not easy for the word processor to detect such wrong conversions of "hiraganas" to "kanjis". A syntactical sentence analysis using information related to the meanings of sentences enables the detection of such a wrong conversion.

A first embodiment of this invention will be described herinafter. With reference to FIG. 1, a Japanese-text proofreading system includes a floppy disk device 1, a CRT display 2, a keyboard 3, a mouse 4, and a microprocessor 5 connected to the devices 1-4. The floppy disk devcice 1 stores document data being edited and proofread. The display 2 indicates document data or the results of proofreading. Document data and instructions are inputted into the system via the keyboard 3. Instructions are inputted into the system also via the mouse 4 by controlling buttons and an encoder in the mouse 4 while monitoring a mouse cursor on the display 2. The microprocessor 5 performs the editing of documents and the proofreading and polishing of texts in accordance with input data, input instructions, and programs.

A hard disk device 6 connected to the microprocessor 5 stores data of a "hiragana"-"kanji" converting Japanese dictionary for the editing of documents, data of a Japanese dictionary for the proofreading of documents, data of grammar rules for the proofreading of documents, data of documents being edited and proofread, and programs for the editing and proofreading of documents. A read-only memory (ROM) connected to the microprocessor 5 stores an operating system program for controlling the system and the respective devices within the system, and character font data for characters indicated on the display 2. A random-access memory (RAM) 8 is connected to the microprocessor 5. At a start of the operation of the system, a Japanese word processor program for the editing of Japanese documents, a Japanese-text proofreading and polishing main program, a dictionary retrieve and morphological analysis program, and a program for analyzing the semantics and syntax of at least part of sentences are transferred from the hard disk device 6 to the RAM 8 via the microprocessor 5. During the operation of the system, the RAM 8 stores data of documents being edited and proofread, data for the proofreading of documents, and data used in the operation of the microprocessor 5 which is based on the operating system program.

When a floppy disk storing a document to be proofread is inserted into the floppy disk device 1 and a reading instruction is inputted into the system via the mouse 4, the microprocessor 5 transfers the document from the floppy disk to a document storing area of the RAM 8 and also transfers various programs for the hard disk device 6 to a program storing area of the RAM 8 in accordance with the operating system program in the ROM 7. When the user requires the forming of a new document, the user inputs a corresponding instruction into the system via the mouse 4 and then the microprocessor 5 clears the document storing area of the RAM 8 in accordance with the operating system program.

A left-hand half of the screen of the display 2 is sllotted for the editing of documents which is performed in the Japanese word processing. A right-hand half of the screen of the display 2 is allotted for the indication of the results of the text proofreading and polishing. The left-hand half of the screen of the display 2 indicates the contents of a Japanese document by use of the character font data within the ROM 7. While the user monitors the left-hand half of the screen of the display 2, the Japanese document can be edited by operating the keyboard 3 and by using the Japanese word processor program in the RAM 8 and the data of the "hiragana"-"kanji" converting Japanese dictionary in the hard disk device 6.

A lower portion of the left-hand half of the screen of the display 2 indicates software buttons corresponding to various jobs including the proofreading. When the software button corresponding to the proofreading is selected via the mouse 4, data of a document which is being edited are analyzed in accordance with the text proofreading and polishing program in the RAM 8. During the analysis of the document data, when a sentence which is wrong from the standpoint of the syntax or the semantics is found, a wrong part of the sentence is indicated in the form of a software button on the right-hand half of the screen of the display 2. When the software button corrsponding to the wrong part is selected via the mouse 4, an explanation of the wrong part is indicated on an upper portion of the right-hand of the screen of the display 2. While the user refers to the information indicated on the right-hand half of the screen of the display 2, the document can be corrected by use of the Japanese word processor associated with the left-hand half of the screen of the display 2. After the editing and proofreading of a document is completed, a software button in the lower part of the left-hand half of the screen of the display 2 which corresponds to a saving instruction is selected via the mouse 4. In compliance with the saving instruction, the document data is stored into the hard disk device 6 or the floppy disk device 1.

Figure 2:
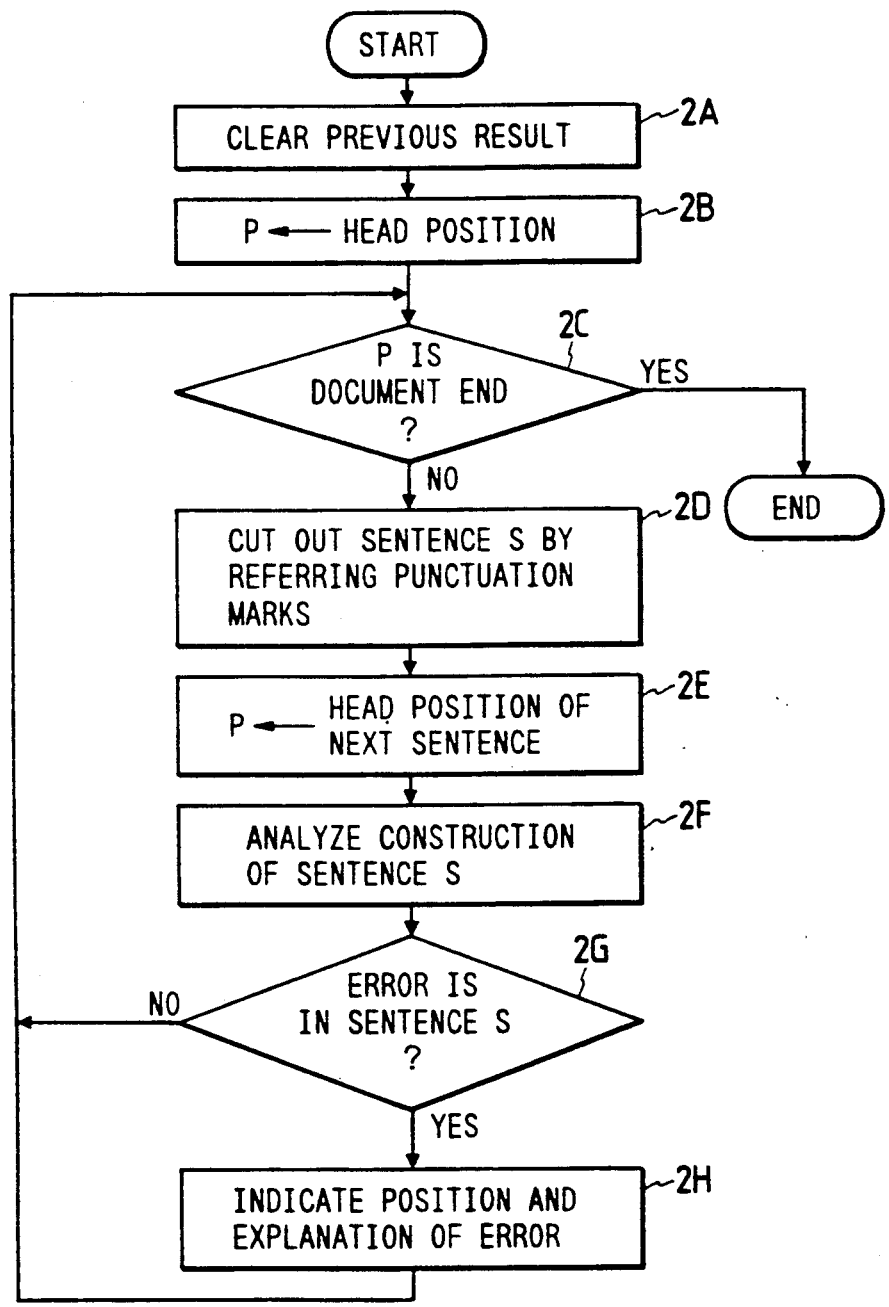
FIG. 2 is a general flowchart of a Japanese-text proofreading and polishing program in the system of FIG. 1.

The Japanese-text proofreading and polishing program in the RAM 8 is used in the heart of the proofreading and polishing of documents. FIG. 2 is a general flowchart of the Japanese-text proofreading and polishing program. As shown in FIG. 2, when the execution of the program is started, the program advances to a first block 2A which clears the indication of the results of the previously-performed proofreading from the right-hand half of the screen of the display 2. A block 2B subsequent to the block 2A sets the position of a head of a document in the variable "p" representing an attention point in the document. After the block 2B, the program advances to a block 2C. The block 2C judges whether or not the attention point "p" agrees with an end of the document. When the attention point "p" agrees with the end of the document, the program is ended. When the attention point "p" diagrees with the end of the document, the program advances to a block 2D. The block 2D cuts out or extracts a sentence from the part of the document which follows the attention point "p", by referring to punctuation marks and points of the change of lines along which characters are arranged. The cutout sentence is represented by the variables "s". A block 2E subsequent to the block 2D updates the attention point "p" by setting the position of a head of a sentecne following the cutout sentence in the variable "p". A block 2F subsequent to the block 2E analyzes the syntax or the construction of the cutout sentence "s". A block 2G subsequent to the block 2F judges whether or not at least an error is present in the cutout sentence "s" by referring to the results of the analysis executed by the preceding block 2F. When an error is absent from the cutout sentence "s", the program returns to the block 2C. When an error is present in the cutout sentence "s", the program advances to a block 2H. The block 2H instructs the display 2 to indicate the position of the error relative to the document and an explanation of the error. After the block 2H, the program returns to the block 2C.

Figure 3:
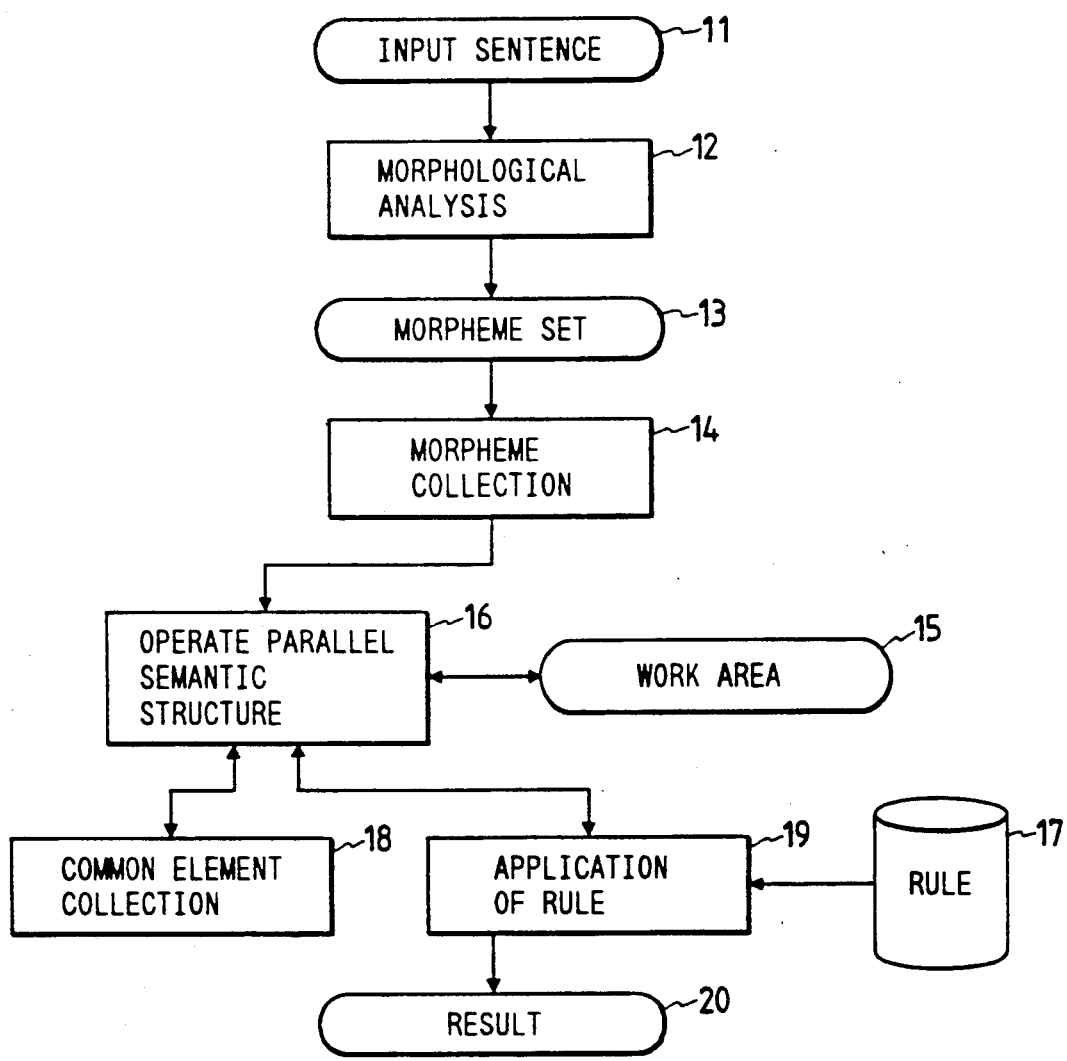
FIG. 3 is a diagram of a part of the system of FIG. 1.

The syntactic analysis of the sentence which is executed by the block 2F uses a novel method of analyzing the syntax and semantics of a sentence. The syntactic analysis of the sentence will be described in detail hererinafter. With reference to FIG. 3, an input Japanese sentence 11 includes a mixture of "hiraganas" and "kanjis". Means 12 functions to detect or recognize morphemes within the input sentence. Elements of a set 13 includes morphemes composed of positions representing the connections of the morphemes outputted from the means 12 and other morphemes, and composed of semantic structures having names being syntactic categories (construction categories) of the morphemes. Means 14 functions to collect the morphemes of the set 14 which have equal position and equal syntactic categories. The means 14 also functions to convert the collected morphemes into a signal composite morpheme having a parallel semantic structure. A work area 15 holds the intermediate results of the semantic analysis and the syntactic analysis of the sentence, and a set of the collected morphemes outputted from the means 14. Means 16 functions to operate on the collected morphemes, phrases, and the parallel semantic structure. Grammar rules 17 are expressed in an augmented context-free style. Means 18 functions to collect the morphemes (the sentence elements) in the work area 15 which have equal positions and equal syntactic categories. The means 18 also functions to convert the collected morphemes into a single composite morpheme phase or sentence having a parallel semantic structure. Means 19 functions to collect the morphemes (the sentence elements) in the work area 15 in accordance with the grammer rules 17 and to derive all of possible structures or syntaxes. Analysis results 20 are expressed in the parallel semantic structure including all of the possible structures of the input sentence 11 which are finally recognized by the means 19.

Figure 4:
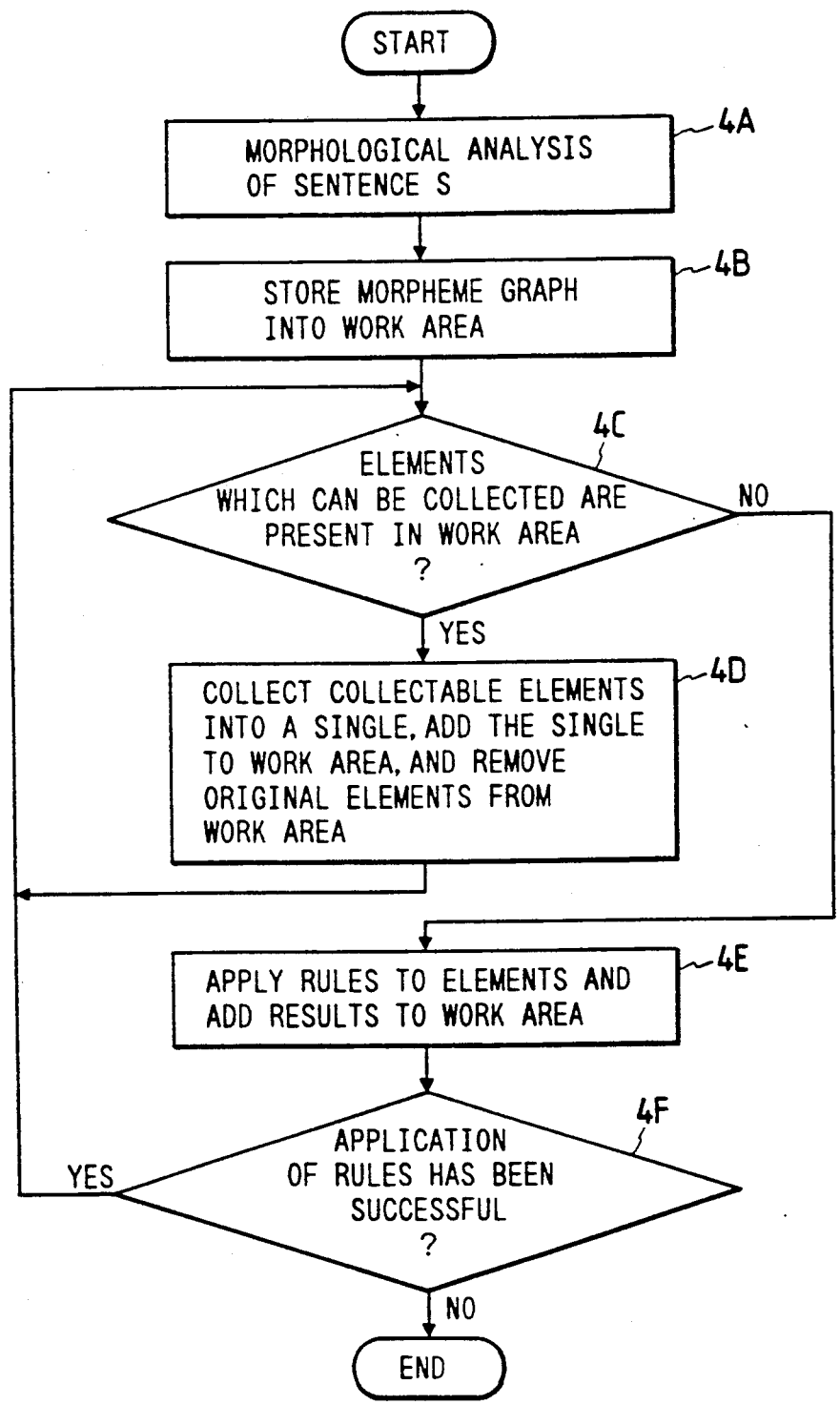
FIG. 4 is a general flowchart of a syntactic analysis program in the system of FIG. 1.

FIG. 4 is a general flowchart of a program for the syntactic analysis of the sentence. As shown in FIG. 4, when this program is started, the program advances to a block 4A which analyzes morphemes of the sentence "s". A block 4B subsequent to the block 4A stores a graph of the obtained morphemes into the work area. After the block 4B, the program advances to a block 4C. The block 4C judges whether or not there are at least two of the morphemes in the work area which can be collected together. When there are at least two of the morphemes which can be collected together, the program advances to a block 4D. Otherwise, the program advances to a block 4E. The block 4D collects the collectable morphemes into a new single morpheme and adds the new morpheme to the work area. The block 4D also removes the original morphemes, which are collected together into the new morpheme, from the work area. After the block 4D, the program returns to the block 4C. The block 4E applies the augmented context-free grammer rules to the morphemes in the work area, and adds the results of the application to the work area. A block 4F subsequent to the block 4E judges whether or not the application of the augmented context-free grammer rules by the preceding block 4E has been successful. When the application of the rules has been successful, the program returns to the block 4C. When the application of the rules has not been successful, the program is ended.

The syntactic analysis of the sentence will be described further in connection with an example where the sentence is "kurumadehakoohakobu". In fact, the sentence parts "kurumadehakoo" and "bu" are expressed in "hiraganas" while the remaining sentence part "hako" is expressed in a "kanji". In the description, this sentence is expressed in "romajis" for convenience. The means 12 includes a dictionary, a table indicating grammatically acceptable connections between morphemes, and a heuristic knowledge of ordering the priorities of possible interpretations. By use of the dictionary, the table, and the knowledge, the means 12 outputs a set of morphemes the contents of which are as follows.

```
{((0),1,     [verb [expression [kuru (ku is expressed by a
              first kanji meaning "come" and ru is expressed by
              a hiragana)]]
              [conjugation [modifying indeclinable part]]
              [v.i./v.t. [v.i.]]
              [case-pattern [A] [B]]]),
 ((0),1,     [verb [expression [kuru (ku is expressed by a
              second kanji meaning "roll" and ru is expressed by
              a hiragana)]]
              [conjugation [modifying indeclinable part]]
              [v.i./v.t. [v.i.]]
              [case-pattern [B]]]),
 ((0),2,     [noun [expression [kuruma (expressed by third and
              fourth kanjis)]]
              [sem-label/semantic-marker [G] [C]]]),
 ((0),3,     [noun [expression [kuruma (expressed by a fifth
              kanji meaning "motor vehicle")]]
              [meaning label [E] [C]]]),
 ((1),3,     [noun [expression [ma (expressed by a sixth
              kanji meaning "space")]]
              [meaning label [V] [P]]]),
 ((1 2),4,   [adverbial-postpositional-particle [expression
              [made]]]),
 ((3),4,     [case-postpositional-particle [expression [de]]]),
 ((4),5,     [case-postpositional-particle [expression [ha]]]),
 ((4),6,     [noun [expression [hako (expressed by a seventh
              kanji meaning "box")]]
              [meaning label [C] [#]]]),
 ((5),6,     [noun [expression [ko (expressed by an eighth
              kanji meaning "child")]]
              [meaning label [4] [1]]]),
 ((6),7,     [case postpositional word [expression [o]]]),
 ((7),8,     [verb [expression [hakobu (hako is expressed by a
              ninth kanji meaning "carry" and bu is expressed by
              a hiragana)]]
              [conjugation [end form]]
```

-continued
```
              [v.i./v.t. [v.i.]]
              [case pattern [A] [D]]]),
 ((8),9,     [punctuation-mark [expression [.]]])}
```

In this table, the numerals in the parentheses in the left side of the table denote start positions, the numerals following the start positions denote end positions. The start positions and the end positions will be described later. In this table, the expressions format of the contents in the semantic structures includes a name portion storing the name of an expressed word, and an arrangement portion having an arrangement of characteristic items (factors) of the expressed word. Each value in the arrangement portion includes a sub name portion and a sub arrangement portion.

Figure 5:
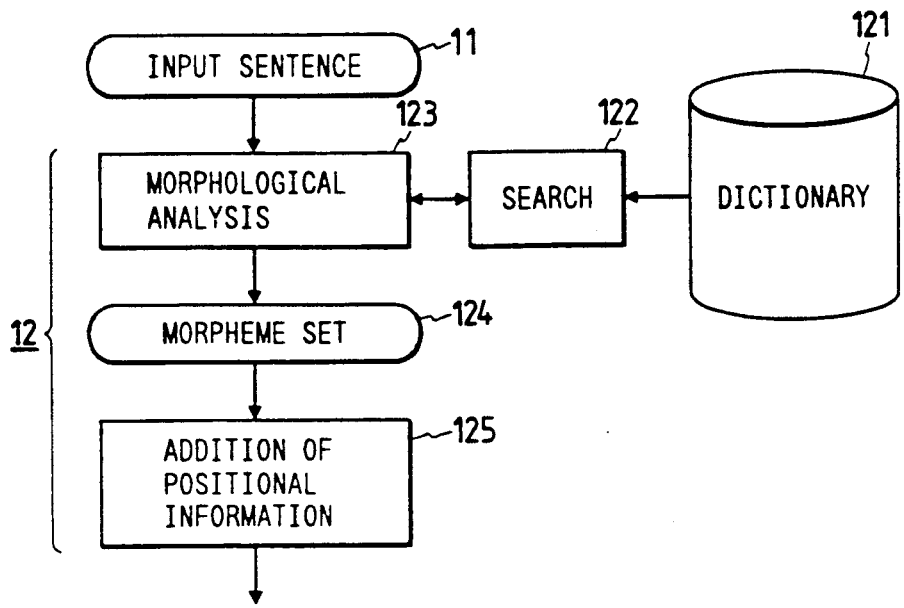
FIG. 5 is a diagram of a part of the system of FIG. 1.

As shown in FIG. 5, the analyzing means 12 includes an electronic dictionary 121 having expressions, reading, parts of speech, and semantic information of morphemes. Means 122 functions to search all morphemes which agree with a leftmost part of a designated sequence of characters including "kanjis", by referring to the dictionary 121. Means 123 operates on the input sentence 11 by referring to information from the means 122 and functions to determine and output all of interpretations (morpheme sequences) which have the smallest number of clauses in the morpheme sequences. A set 124 of the morpheme sequences outputted from the means 123 have information related to the expressions, the readings, the parts of speech, and the semantic information. Means 125 functions to calculate a plurality of start positions and a plurality of end positions which are positional information representing whether or not the respective morphemes in each of the morpheme sequence 124 can be connected. The means 125 adds the positional information to the respective morphemes in the morpheme sequences 124.

Figure 6:
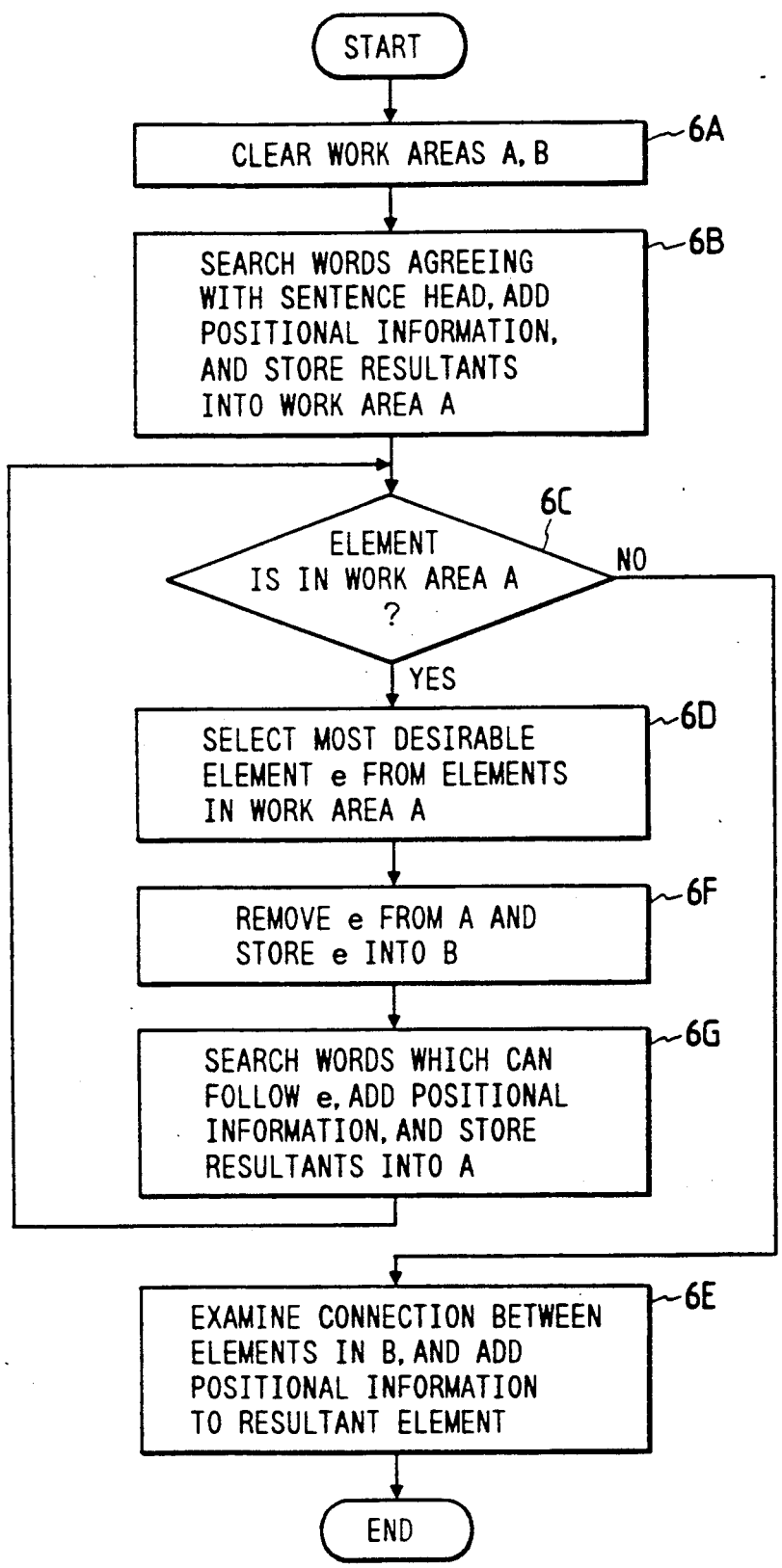
FIG. 6 is a general flowchart of a morphological analysis program in the system of FIG. 1.

FIG. 6 is a general flowchart of a program operating the analyzing means 12. As shown in FIG. 6, when this program is started, the program advances to a block 6A which clears work areas A and B in the means 123. A block 6B subsequent to the block 6A searches a word or words which agree with a head of the input sentence "s" by using the means 122, and adds the position relative to the sentence to each of them and stores the resultants into the work area A. After thee block 6B, the program advances to a block 6C. The block 6C checks whether or not there is at least a morpheme in the work area A. When there is at least a morpheme in the work area A, the program advances to a block 6D. When there is no morpheme in the work area A, the program advances to a block 6E. The block 6D selects the most desirable one of the morphemes in the work area A. The selected morpheme is represented by the variable "e". A block 6F subsequent to the block 6D removes the morpheme "e" from the work area A and adds the morpheme "e" to the work area B. A block 6G subsequent to the block 6F searches a word or words which can be connected with an end of the word "e" by using the means 122, and adds the position relative to the sentence to each of them and stores the resultants into the word area A. After the block 6G, the program returns to the block 6C. The block 6E examines whether or not the morphemes in the work area B can be connected, and gives a plurality of start positions and end positions to morphemes being the results. The block 6E outputs the results as the set 124 of the morpheme sequences. After the block 6E, the program is ended.

The contents of morpheme sequence set 124 are such as indicated below.

([kuruma (expressed by a kanji meaning "motor vehicle")] [de ] [hako (expressed by a kanji meaning "box")] [o] [hakobu (hako is expressed by kanji meaning "carry" and bu is expressed in a hiragana)]), ([kuruma (expressed by a kanji meaning "motor vehicle")] [deha] [ko (expressed by a kanji meaning "child")] [o] [hakobu (hako is expressed by a kanji meaning "carry" and bu is expressed in a hiragana)]), ([kuru (ku is expressed by a kanji meaning "come" and ru is expressed by a hiragana )] [made ] [hako (expressed by a kanji meaning "box")] [o] [hakobu (hako is expressed by a kanji meaning "carry" and bu is expressed in a hiragana)]), ([kuru (ku is expressed by a kanji meaning "come" and ru is expressed by a hiragana)] [made ] [ha] [ko expressed by a kanji meaning "child"] [o ] [hakobu (hako is expressed by a kanji meaning "carry" and bu is expressed in a hiragana )]), ([kuru (ku is expressed by a kanji meaning "come" and ru is expressed by a hiragana)] [ma (expressed by a kanji meaning "space"] [de] [hako (expressed by a kanji meaning "box")] [o] [hakobu (hako is expressed by a kanji meaning "carry" and bu is expressed in a hiragana)]), ([kuru (ku is expressed by a kanji meaning "come" and ru is expressed by a hiragana)] [ma (expressed by a kanji meaning "space"] [deha] [ko (expressed by a kanji meaning "box")] [o] [hakobu (hako is expresesed by a kanji meaning "carry" and bu is expresesed in a hiragana)]), ([kuru (ku is expressed by a kanji meaning "roll" and ru is expressed by a hiragana)] [made ] [hako (expressed by a kanji meaning "box")] [o] [kakobu (hako is expressed by a kanji meaning "carry" and bu is expressed in a hiragana)]).

As indicated hereinbefore, the set 124 has many morpheme sequences which have three clauses. The means 40 receives the morpheme sequence set 124 and scans the respective morpheme sequences simultaneously, and adds start positions and end positions to the respective morphemes, the start positions and the end positions representing the relation of connection between the morphemes. In an example where a morpheme is [kuru (ku is expressed by a kanji meaning "come" and ru is expressed by a hiragana)], two types of morphemes [made] and [ma (expressed by a kanji meaning "space")] are connected. Other morphemes which include [kuru] corresponding to [kuru (ku is expressed by a kanji meaning "come" and ru is expressed by a hiragana)] are [kuru is expressed by a kanji meaning "roll" and ru is expressed by a hiragana)] and [kuru (expressed by two kanjis)]. The morpheme [kuru (ku is expressed by a kanji meaning "roll" and ru is expressed by a hiragana)] is followed by either [made] or [ma (expressed by a kanji meaning "space")]. The morpheme [kuru (expressed by two kanjis)] is followed by [made]. Therefore, the start positions of [kuru (ku is expressed by a kanji meaning "come" and ru is expressed by a hiragana)] and [kuru (ku is expressed by a kanji meaning "roll" and ru is expressed by a hiragana)] are "0", and the end positions thereof are "1". The start position and the end position of [kuru (expressed by two kanjis)] are "0" and "2" respectively. The start position of [ma (expressed by a kanji meaning "space")] is "1". The start position of [made] is "1" or "2". This positional information represents that [kuru (ku is expressed by a kanji meaning "come" and ru is expressed by a hiragana )] and [kuru (ku is expressed by a kanji meaning "roll" and ru is expressed by a hiragana)] are followed by [ma (expressed by a kanji meaning "space")]but [kuru (expressed by two kanjis)] is not followed by [ma (expressed by a kanji meaning "space")].

In this way, morphemes are respesented by start positions, end positions, and semantic structures being names of categories. The start positions and the end positions denote the relation of connection between the morphemes.

Returning to FIG. 3, the means 14 receives the set 13 of the morphemes including the positional information. The means 14 collects all of the morphemes which have the start positions, the end positions, and the parts of speech in common. The collected morphemes compose a combination which is processed as a single morpheme in later steps. For example, [kuru (ku is expressed by a kanji meaning "come" and ru is expressed by a hiragana)] and [kuru (ku is expressed by a kanji meaning "roll" and ru is expressed by a hiragana)] have a common start position "0", a common end position "1", and a common part of speech "verb", so that they compose a morpheme combination such as [(0), 1, verb, ([kuru (ku is expressed by a kanji meaning "come" and ru is expressed by a hiragana)], [kuru (ku is expressed by a kanji meaning "roll" and ru is expressed by a hiragana)])]. In this way, the morphemes having the same positions and the same syntactic categories are collected into a single composite morpheme having a parallel semantic structure where the meanings of the original morphemes are written in parallel but their positions and the syntactic categories are written in common. A set having elements composed of such combinations is stored into the work area 15. At the moment of the completion of the operation of the means 14, the information stored in the work area 15 has the following contents.

{(((0),1,   [v.i./v.t. [v.i.]
    [conjugation [modifying indeclinable part]]
    [OR [nil [expression [kuru (ku is expressed by a
    first kanji meaning "come" and ru is expressed by
    a hiragana)]]
    [case pattern [A] [B]]]]
    [nil [expression [kuru (ku is expressed by a
    second kanji meaning "roll" and ru is expressed by
    a hiragana)]]
    [case pattern [B]]]]]), ((0),2,   [noun [expression [kuruma (expressed by third and
    fourth kanjis)]]
    [meaning label [G] [C]]]), ((0),3,   [noun [expression [kuruma (expressed by a fifth
    kanji meaning "motor vehicle")]]
    [meaning label [E] [C]]]), ((1),3,   [noun [expression [ma (expressed by a sixth
    kanji meaning "space")]]
    [meaning label [V] [P]]]), ((1 2),4,   [sub postpositional word [expression [made]]]),
((3),4,   [case postpositional word [expression [de]]]),
((4),5,   [case postpositional word [expression [ha]]]),
((4),6,   [noun [expression [hako (expressed by a seventh
    kanji meaning "box")]]
    [meaning label [C] [#]]]), ((5),6,   [noun [expression [ko (expressed by an eighth
    kanji meaning "child")]]
    [meaning label [4] [1]]]), ((6),7,   [case postpositional word [expression [o]]]),
((7),8,   [verb [expression [hakobu (hako is expressed by a
    ninth kanji meaning "carry" and bu is expressed by
    a hiragana)]]
    [conjugation [end form]]

-continued

```
        [v.i./v.t. [v.i.]]
        [case pattern [A] [D]]]).
((8).9.  [punctuation mark [expression [.]]])}
```

As shown in this table, [kuru (ku is expressed by a kanji meaning "come" and ru is expressed by a hiragana)] and [kuru (ku is expressed by a kanji meaning "roll" and ru is expressed by a hiragana)] are enclosed together or collected into a single combination. Combinations of items which can not be bundled are expressed by "OR" representing parallel consideration and have names denoted by "nil".

The means 19 and the means 18 alternately operate on the contents of the work area 15 in accordance with the grammar rules 17, sequentially rewriting the contents of the work area 15. The grammar rules 17 have the following contents.

```
{(s → sentence. f1(r)),
(sentence → sentence-element. f2(r)),
(sentence → exclamatory-sentence-element. f3(r)),
(sentence element → case-element•sentence element.
    f4(r1,r2)),
(sentence element → situation-word•sentence element.
    f5(r1,r2)),
(case element → substantive-phrase (substantive-
    compound)•case postpositional word, f6(r1,r2)),
(case post postional word → sub post positional word•case
    post positional word, f7(r1,r2)),
(responsive sentence element → exclamatory-word•sentence
    element. f8(r1,r2)),
(responsive sentence element → exclamatory-word•responsive
    sentence element, f9(r1,r2)),
(responsive sentence element → exclamatory-word•end.
    f10(r1,r2)),
(sentence element → connection word•end, f11(r1,r2)),
(sentence element → declinable-phrase•end, f12(r1,r2)),
(sentence element → case element•end, f13(r1,r2)),
(end → end o•punctuation mark, f14(r1,r2)),
(end → punctuation mark, f15(r)),
(connection word → substantive, f16(r)),
(connection word → "of"-noun-phrase•connection word,
    f17(r1,r2)),
    . . .
    . . .
    . . . }
```

The rewriting of the contents of the work area 15 will be further described hereinafter. There are the following five different interpretations of "kurumade".

1. [kurumade (kuruma is expressed by a kanji meaning "motor vehicle" and de is expressed by a hiragana)]
2. [kurumade (ku is expressed by a kanji meaning "come" and rumade is expressed by hiraganas)]
3. [kurumade (ku is expressed by a kanji meaning "come", ru is expressed by a hiragana, ma is expressed by a kanji meaning "space", and de is expressed by hiragana)]
4. [kurumade (ku is expressed by a kanji meaning "roll" and rumade is expressed by hiraganas)]
5. [kurumade (ku is expressed by a kanji meaning "roll", ru is expressed by a hiragana, ma is expressed by a kanji meaning "space", and de is expressed by hiragana)]

At the stage of the output from the means 14, [kuru (ku is expressed by a kanji meaning "come" and ru is expressed by a hiragana)] and [kuru (ku is expressed by a kanji meaning "roll" and ru is expressed by a hiragana)] are already collected or enclosed together. Therefore, the means 19 generates the following three elements (a), (b), and (c) having the syntactic category "case element".

```
(a) . . . ((0),4,  case element [case expression [made]]
                   [connection word [filling sentence [operation
                   [OR [nil [kuru (ku is expressed by a kanji
                   meaning "come" and ru is expressed by a
                   hiragana)] [nil [kuru (ku is expressed by a
                   kanji meaning "roll" and ru is expressed by a
                   hiragana)]])
(B) . . . ((0),4,  case element [case expression [de]]
                   [connection word [kuruma (expressed by a kanji
                   meaning "motor vehicle")]])
(C) . . . ((0),4,  case element [case expression [de]]
                   [connection word [ma (expressed by a kanji
                   meaning "space")] [modification sentence
                   [OR [nil [kuru (ku is expressed by a kanji
                   meaning "come" and ru is expressed by a
                   hiragana)] [nil [kuru (ku is expressed by a
                   kanji meaning "roll" and ru is expressed by a
                   hiragana)]])
```

These elements (a), (b), and (c) are present in the work area 15. The means 18 collects the common items of the elements (a), (b), and (c) and converts the elements into a single element indicating as follows.

```
((0),4,  case element [OR [nil [case expression [de]]
         [OR [nil [connection word [kuruma (expressed by a
         kanji meaning "motor vehicle")] [nil [connection
         word [ma (expressed by a kanji meaning "space")]
         [modifying-sentence [OR [nil [kuru (ku is
         expressed by a kanji meaning "come" and ru is
         expressed by a hiragana)] [nil [kuru (ku is
         expressed by a kanji meaning "roll" and ru is
         expressed by a hiragana)]
         [nil [case expression [made]] [connection word
         [embedded-sentence [operation [OR [nil [kuru (ku is
         expressed by a kanji meaning "come" and ru is
         expressed by a hiragana)] [nil [kuru (ku is
         expressed by a kanji meaning "roll" and ru is
         expressed by a hiragana)])
```

The grammar rules which have the context-free portion [case element→case element•sentence element, f4(r1,r2)] are applied to the single collected case element, so that the application of the grammer rules to the five different interpretations of "kurumade" is performed at once. The differences in the semantic contents between the respective interpretations are contained in the parallel semantic structure shown in the above table of the contents of the single collected case element. During the application of the grammar rules, these differences are examined with the augmented portions of the rules together with the semantic structures of the sentence elements suited to the second category in the right-hand side. The interpretation or interpretations which cause improper meanings are rejected. The interpretation or interpretations which cause proper meanings are accepted. In respect of the accepted interpretation or interpretations, the semantic structure of the sentence elements being the left-hand side category is generated in the form of a parallel semantic structure including all possible interpretations. The previously-mentioned examination of the meanings, the rejection and acceptance, and the generation of new semantic structures are executed by the means 16 in accordance with the instructions from the means 18 and the augmented part of the respective grammar rules. The instructions from the augmented part which are used to operate the parallel semantic structure have the following contents.

```
f4 =  (lambda (r1 r2)
        (change-value-pair r1 r2 (case-element, connection word)
        (case-element, case-expression, case-pattern)
        (lambda (v1 v2)
        (let ((% verb case information nil))
        (setq % verb-case-information
        (add-value-pair v2 (case-pickup v1)))
        if (case-filling-check, % verb case information)
        (values (case-marker v1), % verb case information)
        (values (nil nil))))))
```

The context-free grammar rules 17 are transferred to the means 16 via the means 19. The parallel semantic structure of the phrases corresponding to the case element and the sentence element in the right-hand side category of the grammar rules is set into the variables r1 and r2. The parallel semantic structure corresponding to the sentence elements of the left-hand side categories of the context-free grammar rules is generated by combining the parallel semantic structure r1 and r2 with the functions such as the "change-value-pair" or the "add-value-pair" executed by the means 16. Otherwise, the application of the grammar rules is prevented by returning a special value or a predetermined value. Finally, a plurality of the highest categories (s categories) with respect to the whole of the input sentence are enclosed together or collected into a single collection. The means 19 outputs the parallel semantic structure of the collected elements as the analysis results 20. The syntactic analysis of the sentence which is executed by the means 19 uses a known method such as Earlay's method (see Earlay, J., "An Efficient Context-Free Parsing Algorithm", Communication of ACM. 13(2), 1970, pp 94-102).

When the semantic analysis is performed in the augmented part of the grammar rules on the basis of the case grammar, the semantic structure associated with the highest categories "s" has the following contents.

```
unit-sentence [predicate [hakobu (hako is expressed by a
kanji meaning "carry" and bu is expressed by a hiragana)]
[style [active] [present] [affirmative]]
[OR [nil [object [case expression [o]]] [connection word
[ko (expressed by a kanji meaning "child")]
[theme [relational-postpositional-particle [ha]
[OR [nil [time [case expression [made]]
[operation [OR [nil [kuru (ku is expressed by a kanji
meaning "come" and ru is expressed by a hiragana)]
[nil [kuru (ku is expressed by a kanji meaning "roll" and
ru is expressed by a hiragana)]
[nil [instrument [connection word [kuruma (expressed by a
kanji meaning "motor vehicle")] [case expression [de]]
[nil [period [case expression [de]]
[modification sentence [OR [nil [kuru (ku is expressed by a
kanji meaning "come" and ru is expressed by a hiragana)]
[nil [kuru (ku is expressed by a kanji meaning "roll" and
ru is expressed by a hiragana)]
[connection word [ma (expressed by a kanji meaning "space")]
[nil [object [case expression [o]] [connection word [hako
(expressed by a kanji meaning "box")]]]
[OR [nil [instrument [connection word [kuruma (expressed by
a kanji meaning "motor vehicle")] [case expression [de]]
[nil [time [case expression [made]
[operation [OR [nil [kuru (ku is expressed by a kanji
meaning "come" and ru is expressed by a hiragana)]
[nil [kuru (ku is expressed by a kanji meaning "roll" and
ru is expressed by a hiragana)]]]
  . . .
  . . .
  . . . )
```

In cases where the input sentence has an error in the syntax or the semantics, the context-free grammar rules can not be applied or the augmented part fails in the semantic analysis so that the highest category "s" can not be generated and the sentence analysis will fail. In these cases, the information from the rules which can not be applied is transferred to the Japanese-text proofreading and polishing program, and the information is used in identifying the position of the error and in generating the explanation of the error.

DESCRIPTION OF THE SECOND PREFERRED EMBODIMENT

A second embodiment of this invention is similar to the first embodiment except for design changes indicated hereinafter. The second embodiment is designed so as to analyze an English sentence.

Figure 7:
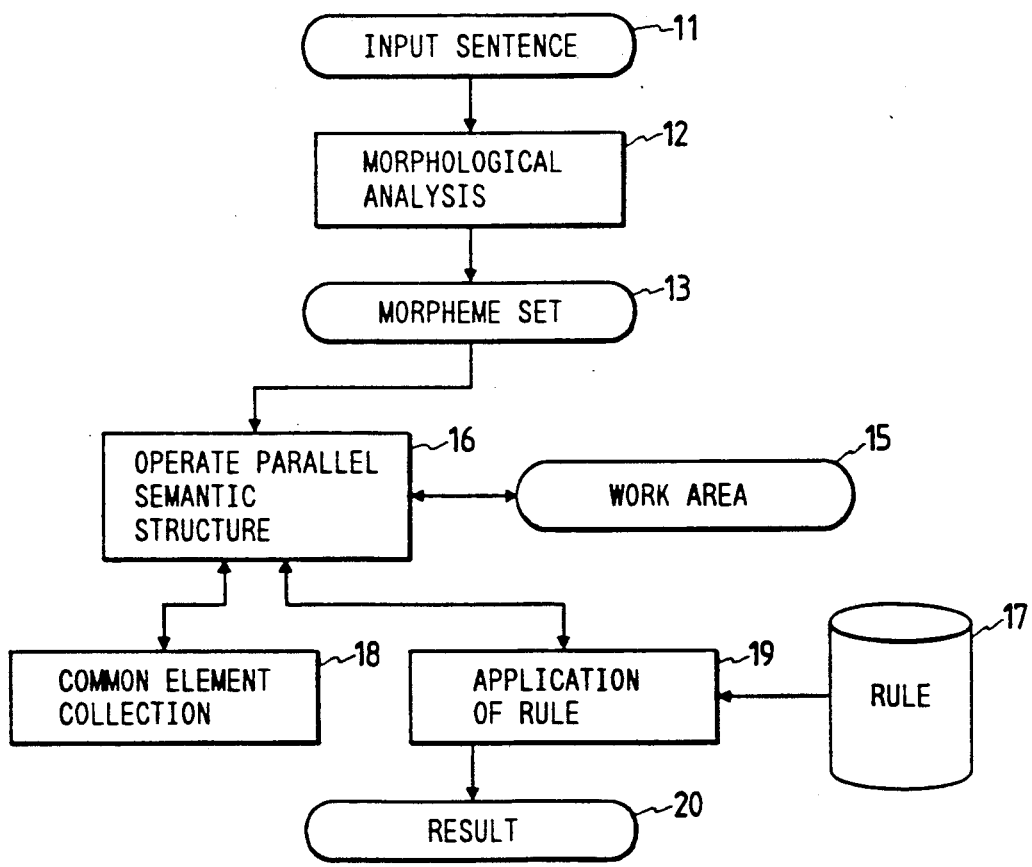
FIG. 7 is a diagram of a part of a system according to a second embodiment of this invention.

The syntactic analysis of the English sentence according to the second embodiment will be described in detail hereinafter. With reference to FIG. 7, an input English sentence 11 includes a sequence of words separated by spaces. Means 12 functions to identify or recognize morphemes within the input sentence 11. Elements of a set 13 include morphemes composed of positions representing the connections of the morphemes outputted from the means 12 and other morphemes, and composed of semantic structures having names being syntactic categories of the morphemes. A work area 15 holds the intermediate results of the semantic analysis and the syntactic analysis of the sentence. Means 16 functions to operate the collected morphemes, phrases, and the parallel semantic structure. The contents of data in the work area 15 is controlled via the means 16. Grammar rules 17 are expressed in an augmented context-free style. Means 18 functions to collect the morphemes (the sentence elements) in the work area 15 which have equal positions and equal syntactic categories. The means 18 also functions to convert the collected morphemes into a single composite morpheme phrase or sentence having a parallel semantic structure. Means 19 functions to collect the elements in the work area 15 in accordance with the grammar rules 17 and to derive all of the possible constructions (syntaxes). Analysis results 20 are expressed in the parallel semantic structure including all of the possible constructions of the input sentence 11 which are finally recognized by the means 19.

The syntactic analysis of the English sentence will be described further in connection with an example where the sentence is "Time flies like an arrow". The means 12 includes a dictionary and a table indicating inflections such as plural forms of nouns, past tenses of verbs, and past participles of verbs. By use of the dictionary and the table, the means 12 outputs a set of morphemes which has contents such as shown in FIG. 8.

Figures 8B, 9:
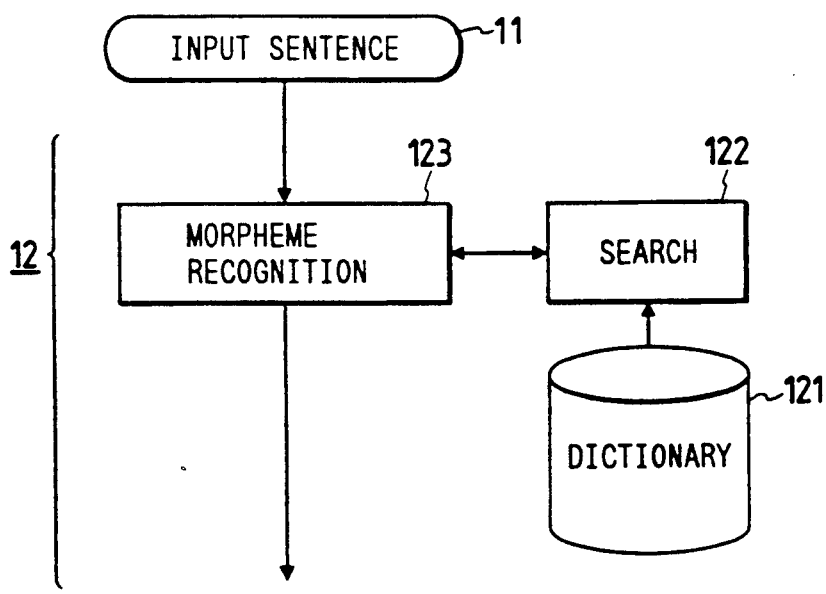

As shown in FIG. 9, the analyzing means 12 includes an electronic dictionary 121 having expressions, parts of speech, and semantic information of morphemes. Means 122 functions to search all morphemes which agree with a designated sequence of letters of the alphabet in expression, by referring to the dictionary 121. Means 123 operates on the input sentence 11 by referring to information from the means 122 and functions to identify or determined words in consideration of the inflections of the respective morphemes. The means 123 generates positional information based on the positions of the morphemes relative to the sentence, and adds the positional information to the morphemes to produce and output a set 13 of position-added morphemes.

The input sentence 11 is received by the means 123, and "Time" and following letter sequences are sequentially exposed by the means 123 to word identification or word determination. For example, in the case of "files", the means 123 searches all of morphemes which agree with this letter sequence in expression, by driving the means 122. This search fails since the dictionary 121 does not have any morpheme which agrees with the letter sequence "flies". Then, the means 123 changes the part "ies" to "y" by referring to the table of the inflections and generates a new letter sequence "fly". The means 123 searches all of morphemes which agree with the new letter sequence in expression, by driving the means 122. The means 123 checks or confirms whether the searched morphemes actually have the inflection between "fly" and "flies". The results are the following two morphemes or words.

1. The third person singular and present tense or "fly" (verb)
2. The plural form of "fly" (noun)

A start position and an end position are given to each of the determined morphemes. The start position of a morpheme is "N-1" and the end position thereof is "N" where "N" represents the order of the morpheme in the sentence. For example, in the case of "flies", the start position is "1" and the end position is "2".

As shown in FIG. 8, a head of information related to each of the morphemes includes numerals indicating the start position and the end position. The start position and the end position are followed by the part of speech, the spelling, and other items. In the morpheme set of FIG. 8, some morphemes are expressed together as described hereinafter. The following part of FIG. 8 is now considered.

```
((1),2, [V    [spelling [fly]]
              [agr [3] [sng]]
              [OR [nil [i/t [i]]
                       [case-pattern [C]]]
                  [nil [i/t [t]]
                       [case-pattern [D] [E]]]]]])
```

Two morphemes are expressed together in this part of FIG. 8 where the start position is "1" and the end position is "2" which are common to the two morphemes. In the semantic structure, the part of the speech is "verb" and the spelling is "fly" which are common to the two morphemes. The agreement portion which is common to the two morphemes includes "third person singular". These equal items of the two morphemes are written in common or represented by a common item. The two morphemes have disagreeing items which are expressed in parallel. The disagreeing items are as follows. The first morpheme is intransitive and has a case pattern [C], while the second morpheme is transitive and has a case pattern [D] and [E].

In this way, the ambiguity at the stage of the dictionary information is expressed in a single parallel semantic structure. The morpheme set 13 obtained by the means 12 is transferred to the work area 15 via the means 16. The means 19 and the means 18 alternately operate on the contents of the work area 15 in accordance with the grammar rules 17, sequentially rewriting the contents of the work area 15. The grammar rules 17 have an augmented context-free style as shown in FIG. 10. The rewriting of the contents of the work area 15 will be described hereinafter. There are two different interpretations of the portion "Time flies" which are shown in FIGS. 11(a) and 11(b). The interpretations of FIGS. 11(a) and 11(b) have the same syntactic categories "s̄" but have the different semantic structures shown respectively in FIGS. 12(a) and 12(b). After the means 19 generates the two morphemes shown in FIGS. 12(a) and 12(b) in the work area 15, the means 18 collects the two morphemes into a single composite morpheme as shown in FIG. 13. Since such grammar rules as "s̄→s̄•pp" which have "s̄" at the right-hand side thereof are applied to the single "s̄", the application of the grammar rules to the two different interpretations is performed at once. As shown in FIG. 13, in the single composite morpheme, the differences in meaning between the two different interpretations are expressed in parallel and are contained in a parallel construction part. During the application of the grammar rules which have "s̄" at the right-hand side thereof to the single composite morpheme, the differences in meaning are examined together with other semantic structures of the right-hand side category by use of the augmented portion of the grammar rules. The interpretation or interpretations which cause improper meanings are rejected. The interpretation or interpretations which cause proper meanings are accepted. In respect of the accepted interpretation or interpretations, the semantic structure of the left-hand side category is generated in the form of a parallel semantic structure including all of possible interpretations. The previously-mentioned examination of the meanings, the rejection and acceptance, and the generation of new semantic structures are executed by the means 16 in accordance with the instructions from the means 18 and the augmented part of the respective grammar rules. The instructions from the augmented part which are used to operate the parallel semantic structure have contents as shown in FIG. 14. The context-free grammar rules 17 are transferred to the means 16 via the means 19. The parallel semantic structures of the phrases corresponding to "NP" and "VP" in the right-hand side category of the grammar rules are set into the variables r1 and r2. In some cases, the augmented portion combines the respective functions of the means 16 and uses them, generating the parallel semantic structure of the phrase corresponding to the left-hand side category "s̄" of the grammar rules. In other cases, the augmented portion judges that the received parallel semantic structures are unsuited to the generation of the category "s̄", preventing the application of the grammar rules. Finally, a plurality of the highest categories (s categories) with respect to the whole of the input sentence 11 are collected into a single combination. The means 19 outputs the parallel semantic structure of the single combination of the elements as the analysis results 20. The analysis of the sentence construction which is executed by the means 19 uses a known method such as Earlay's method. When the semantic analysis is performed in the augmented part of the grammar rules on the basis of the case grammar, the semantic structure associated with the highest categories "s" has contents as shown in FIG. 15.

What is claimed is:

1. In a computer executing a process of expressing semantic structures wherein semantic structures of morphemes, words, phrases, and a sentence are stored in a storage of the computer in a format of a group having at least zero items, a method of analyzing semantics, comprising the steps of:

reading out the semantic structures from the storage;

collecting at least two of the readout semantic structures into a parallel semantic structure;

storing the parallel semantic structure into the storage;

examining the parallel semantic structure, correcting the parallel semantic structure, generating a new semantic structure on the basis of the parallel semantic structure, and storing the new semantic structure into the storage;

wherein the collecting step comprises deriving the parallel semantic structure in a format of a first group, said first group including therein:
1) all items having equal contents in all noticed semantic structures of morphemes, words, phrases, and a sentence; and
2) a second group obtained for each of the noticed semantic structures by excluding the items contained in 1) from a third group of items of each said noticed semantic structure.

2. In a computer executing a process of expressing semantic structures wherein semantic structures of morphemes, words, phrases, and a sentence are stored in a storage of the computer in a format of a combination of at least zero arranged names of the semantic structures and zero or more arranged values representing characteristics of the semantic structures, a method of analyzing semantics, comprising the steps of:

reading out the semantic structures from the storage;

collecting at least two of the readout semantic structures, which have a common name, into a parallel semantic structure;

storing the parallel semantic structure into the storage;

examining the parallel semantic structure, correcting the parallel semantic structure, generating a new semantic structure on the basis of the parallel semantic structure, and storing the new semantic structure into the storage;

wherein the collecting step comprises deriving the parallel semantic structure in a format of a combination of the common name and a first arrangement, said first arrangement including therein:
1) all values having equal contents in all noticed semantic structures of morphemes, words, phrases, and a sentence; and
2) values determined in a format of a combination of a second arrangement of values which is obtained by excluding the values contained in 1) from a third arrangement of: (i) values of each said noticed semantic structure, (ii) a first specific name representing a portion of a combination of a plurality of semantic structures, and (iii) a second specific name representing a combination of a plurality of semantic structures.

3. The method of claim 2 wherein the collecting step comprises expressing the values in a format of a group of combinations of names representing characteristics to be expressed and an arrangement of values representing more specific characteristics to be expressed.

4. In a semantics analyzing system where each of a plurality of morphemes is represented by characterizing factors, a method of collecting equal characterizing factors of different morphemes into a common expression to increase a semantics analyzing efficiency, the method comprising the steps of:

deriving morphemes from at least part of a sentence;

expressing each morpheme by: (i) a position of the morpheme relative to said part of the sentence, (ii) a syntactic category of the morpheme, and (iii) a meaning of the morpheme; and collecting at least two of the morphemes into a composite morpheme, wherein the collected morpheme have equal positions and equal syntactic categories but different meanings, and wherein the composite morpheme has a parallel semantic structure where the meanings of the collected morphemes are written in parallel but the positions and the categories of the collected morphemes are written in common.

5. In a semantics analyzing system where each of a plurality of morphemes is represented by characterizing factors, an apparatus for collecting equal characterizing factors of different morphemes into a common expression to increase a semantics analyzing efficiency, the apparatus comprising:

means for deriving morphemes from a portion of a sentence;

means for expressing each morpheme by: (i) a position of the morpheme relative to said part of the sentence, (ii) a syntactic category of the morpheme; and (iii) a meaning of the morpheme; and means for collecting at least two of the morphemes into a composite morpheme, wherein the collected morphemes have equal positions and equal syntactic categories but different meanings, and wherein the composite morpheme has a parallel semantic structure where the meanings of the collected morphemes are written in parallel but the positions and the categories of the collected morphemes are written in common.

* * * * *

UNITED STATES PATENT AND TRADEMARK OFFICE
CERTIFICATE OF CORRECTION

PATENT NO. : 5,099,425
DATED : March 24, 1992
INVENTOR(S) : Yuji Kanno, Kenji Nagao and Kenichi Ueda It is certified that error appears in the above-identified patent and that said Letters Patent is hereby corrected as shown below:

On the cover page, Item [75] should read as follows:

[75] Inventors: --Yuji Kanno; Kenji Nagao, both of Kawasaki; Kenichi Ueda, Tokyo, all of Japan--

Signed and Sealed this

Twenty-ninth Day of June, 1993

Attest:

MICHAEL K. KIRK

Attesting Officer

Acting Commissioner of Patents and Trademarks